United States Patent
Wei et al.

(10) Patent No.: US 9,512,882 B2
(45) Date of Patent: Dec. 6, 2016

(54) BEARING SYSTEM AND CAGE FOR BEARING

(71) Applicant: Schaeffler Technologies AG & Co. KG, Herzogenaurach (DE)

(72) Inventors: Lai Wei, Shanghai (CN); Hualiang Hu, Shanghai (CN); Chenyu He, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/837,577

(22) Filed: Aug. 27, 2015

(65) Prior Publication Data
US 2016/0108969 A1    Apr. 21, 2016

(30) Foreign Application Priority Data
Oct. 15, 2014  (CN) .......................... 2014 1 0545623

(51) Int. Cl.
| F16C 41/04 | (2006.01) |
| F16C 41/00 | (2006.01) |
| G01M 13/04 | (2006.01) |
| G01K 1/02 | (2006.01) |
| G01K 13/08 | (2006.01) |
| F16C 19/28 | (2006.01) |

(52) U.S. Cl.
CPC ............. *F16C 41/008* (2013.01); *F16C 19/28* (2013.01); *G01K 1/024* (2013.01); *G01K 13/08* (2013.01); *G01M 13/04* (2013.01)

(58) Field of Classification Search
CPC ............................... F16C 41/008; G01K 1/024
See application file for complete search history.

(56) References Cited

U.S. PATENT DOCUMENTS

| 7,471,198 | B2 * | 12/2008 | Yamamoto | .......... F16C 33/4623 |
| | | | | 235/385 |
| 7,780,357 | B2 * | 8/2010 | Varonis | ................... G01P 3/443 |
| | | | | 324/178 |
| 2003/0030565 | A1 | 2/2003 | Sakatani et al. | |

FOREIGN PATENT DOCUMENTS

| DE | 19944652 | 5/2002 |
| WO | 2013160053 | 10/2013 |

* cited by examiner

*Primary Examiner* — Thomas R. Hannon
(74) *Attorney, Agent, or Firm* — Volpe and Koenig, P.C.

(57) ABSTRACT

A bearing system and a cage for a bearing are provided. The bearing system includes a bearing, the bearing including: an outer race; an inner race; a roller which is disposed between the outer race and the inner race in a radial direction of the bearing; and a cage which is also disposed between the outer race and the inner race in the radial direction of the bearing and used for keeping the roller. The bearing system further includes a condition monitoring system, the condition monitoring system including: an RFID chip which is fixed to the cage; a printed circuit wire with which the RFID chip is electrically connected, and which is disposed along a circumferential body of the cage and remains conductive so long as a portion of the cage covered by the printed circuit wire is kept intact; and an RFID reader which can communicate with the RFID chip through a radio frequency signal to monitor a condition of the cage. The technical solution of the invention can monitor the condition of the bearing cage more effectively and reliably.

11 Claims, 3 Drawing Sheets

BEARING SYSTEM AND CAGE FOR BEARING

INCORPORATION BY REFERENCE

The following documents are incorporated herein by reference as if fully set forth: Chinese Patent Application No.: 201410545623.7, filed Oct. 15, 2014.

BACKGROUND OF THE INVENTION

1. Field of the Invention

The invention relates to a bearing system and a cage for a bearing.

2. Description of Related Art

When a bearing is exposed to a vibration, a force of inertia may be so great as to cause fatigue cracks in the cage after a period of time, which may finally lead to an damage to the whole bearing.

At present, a conventional method of monitoring an operating condition of the bearing is to use a corresponding sensor fixed to an outer race of the bearing to measure a vibration or temperature of the bearing. As shown in FIG. 1, the bearing includes an outer race 1a, an inner race 2a, a roller 3a and a cage 4a, and an acceleration/temperature sensor 5a is disposed on the outer race 1a for measuring the vibration or temperature of the bearing. According to the measured abnormal vibration level or high temperature, a bearing failure in the inner race, the outer race or the roller of the bearing may be detected.

However, for cracks in the cage in an early stage, this vibration or temperature measuring method is not always effective, and for monitoring of the cracks in the cage in the early stage, this vibration or temperature measuring method is not a reliable monitoring method. In most of cases, the cage of the bearing is still required to be checked manually.

Moreover, the bearing cage is generally only a mechanical part, and generally, there is no sensor on this part. The bearing cage itself cannot provide any information about its operating condition. In the early stage when the cracks appear in the bearing cage, the measurement of the vibration or temperature of the bearing also fails to effectively give information of a cage failure. Once the cage begins to have a small crack, a damage process of the cage is very fast. Sometimes, it is too late when the vibration or temperature of the bearing reaches a warning level. The measurement of the vibration also suffers from an environment influence. In addition, to check the condition of the bearing manually, the bearing is required to be dissembled, which is very time consuming and thus makes a late maintenance cost of the bearing very high

SUMMARY OF THE INVENTION

In view of the above technical problem in the prior art, the object of the invention is to develop a bearing system and a cage for a bearing, which can monitor the condition of the bearing cage more effectively and reliably.

Based on the above object, the invention provides a bearing system including a bearing, the bearing including:
an outer race;
an inner race;
a roller which is disposed between the outer race and the inner race in a radial direction of the bearing; and
a cage which is also disposed between the outer race and the inner race in the radial direction of the bearing and used for keeping the roller, characterized in that
the bearing system further includes a condition monitoring system, the condition monitoring system including:
an RFID chip which is fixed to the cage;
a printed circuit wire with which the RFID chip is electrically connected, and which is disposed along a circumferential body of the cage and remains conductive so long as a portion of the cage covered by the printed circuit wire is kept intact; and
an RFID reader which can communicate with the RFID chip through a radio frequency signal to monitor a condition of the cage.

It is preferred that the cage is configured into an annular shape, and the cage includes:
a first annular portion which extends along a circumferential direction of the bearing;
a second annular portion which extends along the circumferential direction of the bearing, the second annular portion and the first annular portion being separated from each other along an axial direction of the bearing; and
a plurality of axial connection portions which connect the first annular portion and the second annular portion along the axial direction of the bearing to form a plurality of pockets for receiving the rollers,
wherein the RFID chip and the printed circuit wire are both disposed on a surface of a portion of the cage not in contact with the rollers.

It is preferred that the RFID chip is fixed to an axial outer side surface of any one of the first annular portion and the second annular portion, and the printed circuit wire is disposed on an inner circumferential surface and/or outer circumferential surface of at least one of the first annular portion, the second annular portion and the axial connection portions in a circumferentially surrounding manner.

It is preferred that the bearing is a double row taper roller bearing and has two cages along the axial direction of the bearing, each of the two cages is provided with one RFID chip, and both of the RFID chips are disposed at an axial middle part of the bearing, and
an inspection hole is disposed at the axial middle part of the outer race of the double row taper roller bearing, the inspection hole passes through the outer race along the radial direction of the bearing, and the RFID reader can be inserted into the inspection hole to approach the RFID chip.

It is preferred that the printed circuit wire is printed on a surface of the cage using a conductive printing ink in a manufacturing process of the cage.

It is preferred that the RFID chip is a passive type RFID chip, in which no power supply is provided.

It is preferred that the bearing system includes a plurality of bearings, each of which is provided with the RFID chip, and all of the RFID chips of the plurality of bearings can communicate with the same RFID reader located outside the plurality of bearings through the radio frequency signal.

The invention further provides a cage for a bearing, the cage being configured into an annular shape, and the cage including:
a first annular portion which extends along a circumferential direction of the bearing;
a second annular portion which extends along the circumferential direction of the bearing, the second annular portion and the first annular portion being separated from each other along an axial direction of the bearing; and
a plurality of axial connection portions which connect the first annular portion and the second annular portion along the axial direction of the bearing to form a plurality of pockets for receiving the rollers, characterized in that the RFID chip and the printed circuit wire are disposed on the cage, wherein the RFID chip is electrically connected with the printed circuit wire, the printed circuit wire is disposed along a circumferential body of the cage and remains conductive so long as a portion of the cage covered by the printed circuit wire is kept intact, and the RFID chip is used for communicating with a RFID reader located outside the cage through a radio frequency signal.

It is preferred that the RFID chip is fixed to an axial outer side surface of any one of the first annular portion and the second annular portion, and the printed circuit wire is disposed on an inner circumferential surface and/or outer circumferential surface of at least one of the first annular portion, the second annular portion and the axial connection portions in a circumferentially surrounding manner.

It is preferred that the printed circuit wire is printed on a surface of the cage using a conductive printing ink in a manufacturing process of the cage.

It is preferred that the RFID chip is a passive type RFID chip, in which no power supply is provided.

The invention adopts RFID communication technology, and thus can monitor the condition of the bearing cage more effectively and reliably. Moreover, according to the invention, an alarm can be given out in time before the occurrence of the bearing failure, thereby avoiding a serious loss caused by damaging the bearing or device; a large number of bearing cages can be monitored at the same time by using the RFID communication technology, which can greatly reduce the cost; and the system of the invention can be easily integrated into other existing condition monitoring systems.

BRIEF DESCRIPTION OF THE DRAWINGS

In order to describe technical solutions of embodiments of the invention more clearly, figures to be used in the descriptions of the embodiments will be briefly introduced below.

DETAILED DESCRIPTION OF THE PREFERRED EMBODIMENTS

In order to make those skilled in the art better understand technical solutions of the invention, technical solutions in embodiments of the invention will be described clearly and completely below with reference to figures in the embodiments of the invention.

The invention relates to bearing cage monitoring technology, which is mainly used for a bearing operating in an environment requiring a very high reliability such as a vehicle bearing of a railway locomotive.

The invention proposes a novel bearing cage with a radio frequency identification (RFID) chip and an associated printed circuit, which can effectively obtain information about cracks of the bearing cage. The information can be accessed by wireless communication technology. An apparatus of the invention can give out an alarm before a failure occurs in the bearing to thereby avoid a serious loss caused by damaging a whole set of the bearing or device.

Figure 1:
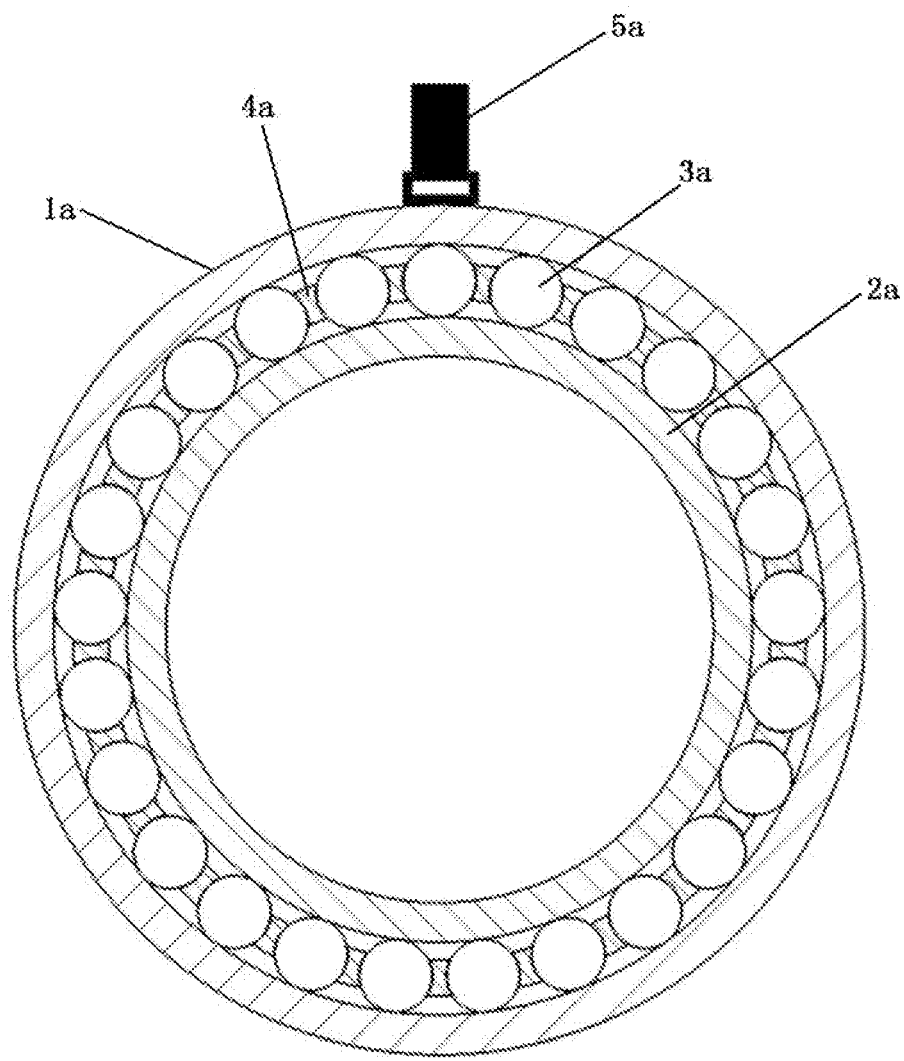
FIG. 1 is a simple view showing a conventional arrangement of monitoring an operating condition of a bearing in the prior art.
Figure 2:
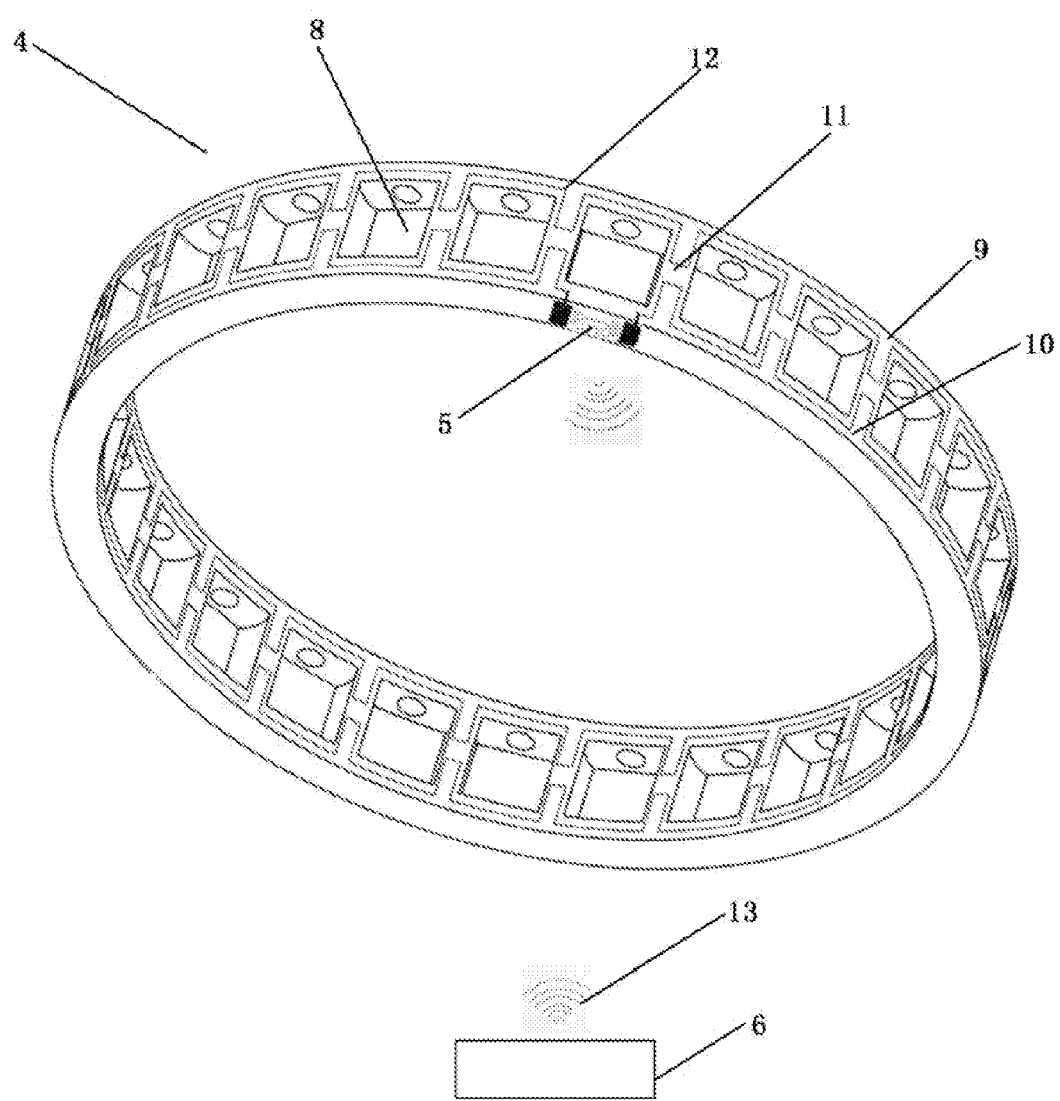
FIG. 2 is a perspective view of a bearing cage in the invention.
Figure 3:
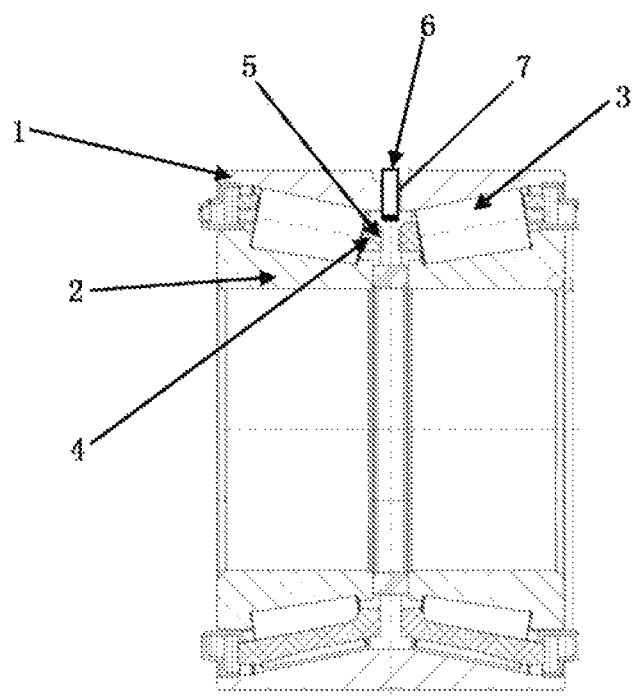
FIG. 3 is an axial sectional view of a bearing system according to one embodiment in the invention.

The solutions of the invention are specifically described by referring to FIG. 2 and FIG. 3. FIG. 2 is a perspective view of a bearing cage in the invention. FIG. 3 is an axial sectional view of a bearing system according to one embodiment in the invention.

As shown in FIG. 3, the invention provides a bearing system including a bearing, the bearing including: an outer race 1; an inner race 2; a roller 3 which is disposed between the outer race 1 and the inner race 2 in a radial direction of the bearing; and a cage 4 which is also disposed between the outer race 1 and the inner race 2 in the radial direction of the bearing and used for keeping the roller 3.

Further, the bearing system of the invention further includes a condition monitoring system, which adopts radio frequency identification (RFID) technology. The radio frequency identification (RFID) is a wireless communication technique, and can identify a special object and read and write relevant data through a radio signal without establishing a mechanical or optical contact between an identification system and the special object.

Referring to FIG. 2 and FIG. 3, the condition monitoring system of the invention includes an RFID chip 5 which is fixed to the cage 4; a printed circuit wire 12 with which the RFID chip 5 is electrically connected, and which is disposed on the cage 4; and an RFID reader 6 which can communicate with the RFID chip 5 through a radio frequency signal to monitor a condition of the cage 4. In the invention, the printed circuit wire 12 can be disposed along a circumferential body of the cage 4 and be kept conductive in the case that a portion of the cage 4 covered by the printed circuit wire 12 is kept intact.

In the invention, a small RFID chip and a relevant printed circuit are disposed on the bearing cage. Specifically, as shown in FIG. 2, the cage 4 can be configured into an annular shape, and the cage 4 includes: a first annular portion 9 which extends along a circumferential direction of the bearing; a second annular portion 10 which extends along the circumferential direction of the bearing, the second annular portion 10 and the first annular portion 9 being separated from each other along an axial direction of the bearing; and a plurality of axial connection portions 11 which connect the first annular portion 9 and the second annular portion 10 along the axial direction of the bearing to form a plurality of pockets 8 for receiving the rollers 3, wherein the RFID chip 5 and the printed circuit wire 12 are both disposed on a surface of a portion of the cage 4 not in contact with the rollers 3. In the invention, the RFID chip and the printed circuit wire are very light, and thus have no adverse impact on a normal function of the cage.

As shown in FIG. 2, the RFID chip 5 and the printed circuit wire 12 on which an insulating layer is coated are disposed along the surface of the bearing cage. The RFID chip 5 is fixed to an axial outer side surface of any one of the first annular portion 9 and the second annular portion 10, and the printed circuit wire 12 is disposed on an inner circumferential surface and/or outer circumferential surface of at least one of the first annular portion 9, the second annular portion 10 and the axial connection portions 11 in a substantially circumferentially surrounding manner. The printed circuit wire 12 forms a single circuit loop as a whole (a connection circumstance of different segments of the circuit loop is not shown in the figure) with its both ends being electrically connected to the RFID chip 5.

In use, the RFID reader 6 generates a radio frequency signal to communicate with the RFID chip 5 and obtain the corresponding information from the RFID chip 5. A reference sign 13 is used in FIG. 2 to indicate a Radio Frequency (RF) signal communication. By adopting an RFID device of a corresponding standard, when the bearing rotates, the communication between the RFID reader 6 and the RFID chip 5 can still operate effectively. Moreover, a communication distance can reach up to 30 meters. In use, the RFID reader can be connected with an external processing device such as a computer to process information from the RFID reader in time.

When the bearing cage is in a good condition, the RFID reader 6 can normally obtain relevant information from the RFID chip 5 on the cage 4. The printed circuit wire 12 can have a thickness of about 0.1 mm, and has no ductility. If the bearing cage has a crack due to a long-time environment vibration, the printed circuit wire will be broken due to the crack, so the printed circuit wire will not be kept conductive any longer, so that the RFID reader 6 will be unable to normally obtain the relevant information from the RFID chip 5 on the cage 4, whereby the occurrence of the break of the cage can be indicated.

The arrangement of the RFID reader can be changed according to an actual application status. For a double row taper roller bearing in a railway locomotive, the arrangement of the RFID reader can be as shown in FIG. 3.

As shown in FIG. 3, the bearing is a double row taper roller bearing and has two cages 4 along the axial direction of the bearing. The two cages 4 are located on a left side and a right side separately in the axial direction, each of the two cages 4 is provided with one RFID chip 5, i.e., there are two RFID chips 5, the two RFID chips 5 are located on the left side and the right side separately in the axial direction, and both of the RFID chips 5 are disposed at an axial middle part of the bearing.

An inspection hole 7 is disposed at the axial middle part of the outer race of the double row taper roller bearing, the inspection hole 7 passes through the outer race 1 along the radial direction of the bearing, and the RFID reader 6 can be inserted into the inspection hole 7 to approach the RFID chip 5. That is, the RFID reader 6 is inserted into the bearing from the inspection hole 7 in the outer race of the bearing, and approaches the bearing cage. As can be seen from FIG. 3, one RFID reader 6 is adopted to be inserted into the inspection hole 7 to communicate with two RFID chips 5 at the same time. Such a design can achieve monitoring the conditions of the cages on both of the left and right sides at the same time.

In the invention, the printed circuit wire 12 can be printed on a surface of the cage 4 using a conductive printing ink in a manufacturing process of the cage 4. In addition, the printed circuit wire 12 can be also fixed to the surface of the cage 4 in the other manners.

In the invention, the RFID chip 5 can be a passive type RFID chip, in which no power supply is provided. The RFID chip can be powered and accessed by the RFID reader through a radio frequency electromagnetic wave, so no additional power supply is to be provided inside the bearing to supply power to the RFID chip. The RFID chip 5 can communicate using an ultra-high frequency (UHF) band. In addition, since a manner of a non-contact measurement is adopted, the RFID reader will not influence a normal operation of the bearing.

In addition, in the invention, the bearing system can include a plurality of bearings, each of which is provided with the RFID chip 5, and all of the RFID chips 5 of the plurality of bearings can communicate with the same RFID reader 6 located outside the plurality of bearings through the radio frequency signal. That is, according to the invention, one RFID reader can be adopted to communicate with a plurality of RFID chips at the same time. In this way, condition information from the bearing cages of a plurality of bearings can be obtained through one RFID reader at the same time. This means that a plurality of bearings can be monitored at the same time, which is very suitable for a condition monitoring system of a bearing of a wheel of a train or subway as shown in FIG. 3.

As can be seen, according to the invention, the bearing cage adopts an RFID sensor to provide condition information; the invention adopts the RFID technology, and thus can achieve a non-contact measurement to thereby monitor the operating condition of the bearing cage in real time without influencing the normal operation of the bearing; according to the invention, an alarm can be given out in time before the occurrence of the bearing failure, thereby avoiding a serious loss caused by damaging the bearing or device; a large number of bearing cages can be monitored at the same time by using the RFID communication technology, which is also very low in terms of the cost; and the system of the invention can be easily integrated into the other existing bearing condition monitoring systems.

The above contents are only some detailed embodiments of the invention. It should be noted that those skilled in the art can further make various combinations or make several improvements and transformations with respect to the above embodiments on the premise of not breaking away from the principle and concept of the invention, and these combinations, improvements and transformations shall be also deemed as ones failing within the scope of protection and concept of the invention.

The invention claimed is:

1. A bearing system comprising a bearing, the bearing comprising:
    an outer race;
    an inner race;
    rolling elements disposed between the outer race and the inner race in a radial direction of the bearing;
    a cage disposed between the outer race and the inner race in the radial direction of the bearing and used for holding the rolling elements, and
    a condition monitoring system, the condition monitoring system comprising:
        an RFID chip fixed to the cage;
        a printed circuit wire electrically connected to the RFID chip, and which is disposed along a circumferential body of the cage and remains conductive so long as a portion of the cage covered by the printed circuit wire is kept intact; and
        an RFID reader that communicates with the RFID chip through a radio frequency signal to monitor a condition of the cage.

2. The bearing system according to claim 1, wherein the cage is configured in an annular shape, and the cage comprises:
    a first annular portion which extends along a circumferential direction of the bearing;
    a second annular portion which extends along the circumferential direction of the bearing, the second annular portion and the first annular portion being separated from each other along an axial direction of the bearing; and
    a plurality of axial connection portions which connect the first annular portion and the second annular portion along the axial direction of the bearing to form a plurality of pockets for receiving the rolling elements,
    wherein the RFID chip and the printed circuit wire are both disposed on a surface of a portion of the cage not in contact with the rolling elements.

3. The bearing system according to claim 2, wherein the RFID chip is fixed to an axial outer side surface of any one of the first annular portion and the second annular portion, and the printed circuit wire is disposed on at least one of an inner circumferential surface or outer circumferential surface of at least one of the first annular portion, the second annular portion, or the axial connection portions in a circumferentially surrounding manner.

4. The bearing system according to claim 1, wherein bearing is a double row taper roller bearing and has two of the cages located along the axial direction of the bearing, each of the two cages is provided with one of the RFID chips, and both of the RFID chips are disposed at an axial middle part of the bearing, and an inspection hole is disposed at the axial middle part of the outer race of the double row taper roller bearing, the inspection hole passes through the outer race along the radial direction of the bearing, and the RFID reader is inserted into the inspection hole to approach the RFID chip.

5. The bearing system according to claim 1, wherein the printed circuit wire is printed on a surface of the cage using a conductive printing ink in a manufacturing process of the cage (4).

6. The bearing system according to claim 1, wherein the RFID chip is a passive type RFID chip, in which no power supply is provided.

7. The bearing system according to claim 1, wherein the bearing system comprises a plurality of bearings, each of which is provided with one of the RFID chips, and all of the RFID chips of the plurality of bearings communicate with the same RFID reader located outside the plurality of bearings through the radio frequency signal.

8. A cage for a bearing, the cage being configured into an annular shape, and the cage comprising:

a first annular portion that extends along a circumferential direction of the bearing;

a second annular portion which extends along the circumferential direction of the bearing, the second annular portion and the first annular portion being separated from each other along an axial direction of the bearing;

a plurality of axial connection portions which connect the first annular portion and the second annular portion along the axial direction of the bearing to form a plurality of pockets for receiving the rollers, an RFID chip and a printed circuit wire disposed on the cage, the RFID chip being electrically connected with the printed circuit wire, the printed circuit wire is disposed along a circumferential body of the cage and remains conductive so long as a portion of the cage covered by the printed circuit wire is kept intact, and the RFID chip communicates with an RFID reader located outside the cage through a radio frequency signal.

9. The cage for a bearing according to claim 8, wherein the RFID chip is fixed to an axial outer side surface of any one of the first annular portion and the second annular portion, and the printed circuit wire is disposed on at least one of an inner circumferential surface or an outer circumferential surface of at least one of the first annular portion, the second annular portion, or the axial connection portions in a circumferentially surrounding manner.

10. The cage for a bearing according to claim 8, wherein the printed circuit wire is printed on a surface of the cage using a conductive printing ink in a manufacturing process of the cage.

11. The cage for a bearing according to claim 8, wherein the RFID chip is a passive type RFID chip, in which no power supply is provided.

\* \* \* \* \*